May 17, 1966

T. A. SMITH 3,251,461

TANK REPAIR MECHANISM

Filed Oct. 1, 1963

INVENTOR
TALBOT A. SMITH

BY
ATTORNEYS

United States Patent Office 3,251,461
Patented May 17, 1966

3,251,461
TANK REPAIR MECHANISM
Talbot A. Smith, Baltimore, Md.; Betty Helene Smith, administratrix of Talbot Alan Smith, deceased, assignor to Permanent Tank Bottom Company, Inc.
Filed Oct. 1, 1963, Ser. No. 313,023
2 Claims. (Cl. 206—47)

This invention relates to containers of various kinds including tanks used for fluids and in which leaks sometimes occur, to the repair of such containers to maintain them in use, and to mechanisms by which such repairs can be accomplished.

The invention relates particularly to repair mechanism by which tanks for containing fluids may be repaired both as to small leaks, as well as the application of additional tank bottoms to prevent the loss of the tanks' contents and to increase the life of the tanks for an indefinite period.

Tanks for oil and other fuels have developed small leaks which prevented their passing inspection and satisfactory use, as well as occasioned expensive repairs, and to stop leaks, patches of various kinds have been provided, some of which were of the magnetic type. Some repair mechanisms performed the function for which they were intended for only a limited amount of time, were bulky, expensive, would not fit the curved surface of the tank, and otherwise have not been satisfactory.

It is an object of the invention to provide a relatively simple, inexpensive, practical oil tank leak repair mechanism including a magnetic patch of relatively small size, which can be easily applied from the exterior either to a flat or curved surface, and an auxiliary tank bottom which can be applied over such magnetic patch.

Another object of the invention is to provide a leak repair kit of the character indicated which includes a sealing compound which will cover twice the area of a temportary magnetic type repair, which is stronger than others employed, cannot come loose while the tank is being refilled, cannot easily be dislodged, and is of a relatively permanent nature.

A further object of the invention is to provide tank repair mechanism including a sealing compound and a relatively flat magnet which can be pressed into place manually and retained due to magnetic attraction between it and the metal tank to which it is applied, which repair mechanism will perform a four-fold function of conforming to a curved or surface of other configuration, will flow into and fill leaks and openings in a tank to which it is applied, will assist adhesion of a magnet which in turn will maintain a sealing compound in place.

A still further object of the invention is to provide a tank patch of such relatively small size that it will not have to be removed when it is desired to add another tank bottom to a tank to which the patch has been applied.

These and other objects and advantages of the invention will be apparent from the following description taken in conjunction with the accompanying drawing in which:

FIG. 1 is a fragmentary perspective of a fuel tank with a patch applied thereto;

FIG. 2, a section on line 2—2 of FIG. 1;

FIG. 3, a perspective of a tank patch constructed in accordance with the present invention;

FIG. 4, a section on the line 4—4 of FIG. 3;

FIG. 5, a section on the line 5—5 of FIG. 3;

FIG. 6, a perspective of a modified form of patch;

FIG. 7, a section illustrating the manner of application of the patch of FIG. 6 with the flat side of the magnet applied to the patching compound over the hole in the flat area of a tank.

FIG. 8, a section illustrating the manner of application of the patch of FIG. 6 with the round side of the magnet applied to the patching compound over the hole in the round area of a tank;

FIG. 9, a perspective of a modified type of patch;

FIG. 10, a side elevation of the patch of FIG. 9;

FIG. 11, a side elevation of the patch similar to but slightly different to that of FIGS. 9 and 10;

FIG. 12, a perspective of a further modified form of the invention;

FIG. 13, a section on the line 13—13 of FIG. 12;

FIG. 14, a perspective illustrating the container for holding sealing compound and a plate type magnet mounted on the container;

FIG. 15, a perspective of a tank bottom replacement kit and attaching means therefor; and, FIG. 16, a side elevation illustrating one application of the magnet of FIG. 14.

Briefly stated, the present invention is a tank repair mechanism including a relatively small generally flat magnet, a sealing compound and an auxiliary tank bottom to repair and reinforce the lower portion of the tank to extend the life thereof and in which the patch is sufficiently small that it will not interfere with the application of the auxiliary tank bottom, said patch including a sealing compound for application between the magnet and the tank over a leak forming opening and when the magnet is manually pressed against the tank with the sealing compound interposed the latter will be forced into any leak opening and over the adjacent area of the tank where it will be held by the adhesiveness of the compound and the action of the magnet providing only a slight external enlargement of the surface of the tank which will not interfere with the application of a tank bottom having a surface engaging sheet serving as a cushion and as a holder for a bonding agent and which cushion will accommodate the patch when the tank bottom is applied.

With continued reference to the drawing the various forms of patches are illustrated including that of the first five figures as one embodiment, FIGS. 6, 7 and 8 as a second embodiment, FIGS. 9 and 10 as the third embodiment, FIG. 11 as an embodiment which may be considered as a fourth, although it is substantially the same as that of FIGS. 9 and 10, and FIGS. 12 and 13 as an additional embodiment.

The patch of the first five embodiments consists essentially of a rectangular block or holder 10 which may be hollow and of molded plastic, in which one or more bar magnets 11 may be located. The hollow magnet holding member 10 is provided with a pair of generally parallel side slots 12 and 13 in which a pair of plates 14 and 15 are received through which concentrated magnet force is transmitted to a tank wall 16 from the magnets 11, such magnetic force being greater than if distributed over a larger area.

Between the plates which extend substantially above the housing 10 is snugly received a removable block 17 of non-magnetic material which serves as a filler and may be compressible or rubber-like. The thickness of the side edges of the block are substantially equal to the height to which the plates 15 and 16 extend above the housing 10 between such plates, preferably however, such plates extend slightly above the block 17. The block 17 may have a generally flat face 18 and a generally concave face 19 and is adapted to be retained between the plates 14 and 15. The block 17 is adapted to fit against a tank wall and due to its compressibility a tight joint will be provided. If desired a block may have a concave face 19 to be applied next to the tank wall and a flat face 18 which can be applied to the flat end portion, for example, of the tank. To the face of the block which is to be applied to the tank a sealing compound 21 is applied and such face is pressed firmly over the leak opening to be repaired and about the adjacent area with the opening approximately centrally of the face of the block. The sealing compound may be carried in a suitable receptacle such as a jar 20 having a ferrous metal top 20′ to which the magnet holds. The adhesive and relatively plastic sealing compound may be taken from the jar, rolled in a ball and then placed upon the flat face of the magnet, whereupon the compound covered surface of the magnet is placed over the leak opening in the tank and pressure applied to the block to cause the sealing compound to fill openings in the face and through the wall of the tank, excess of the compound being forced outwardly so that it spreads in a thin sheet between the block and the tank surface and provides an adhesive bond which serves also as a sealing medium and is held in place by the magnetic attraction between the magnets 11 through the plates 14 and 15 and the wall of the tank 10 with the leak opening which is sealed.

In FIGS. 6, 7 and 8 a simple plate type magnet 22 is provided which, in addition to being substantially flat, may have one flat surface 23 and one concave surface 24. The magnet is initially mounted on and is detached from the cover of the jar 20 against which it is retained by its inherent magnetism, then sealing compound is applied. The sealing compound 21 used in this embodiment may be of a character such as that previously described and may be applied to one face of the magnet and pressed against the surface 25 of a tank having a leak opening 26. This patch kit therefore consists only of a plate type magnet and the sealing compound or composition which is relatively stable or insoluble in the presence of water as well as in the contents of the tank, such as oil, gasoline or the like.

With reference to FIGS. 9 and 10 a further modified form of the invention is disclosed in which a magnet 27 is fixed to a U-shaped holder 28 in any desired manner. The poles of the magnet are disposed adjacent to the flanges of the holder 28 so that magnetic force will be transmitted through the flanges to the walls of the tank being repaired. The flanges are of a length substantially equal to the thickness of the magnet 27 so that when the sealing compound 21 is applied to the exposed face of the magnet the device may be applied to a relatively flat wall and the sealing compound will be extruded into the opening while the magnet retains the device in position.

FIG. 11 discloses a modified form of the invention similar to that of FIGS. 9 and 10 with the exception that the arms of the holder 28′ extend upwardly above the surface of the magnet 27 and the sealing compound so that the magnet coated with the sealing compound may be applied to the curved surface of a tank or other ferrous structure having an opening to be sealed.

With reference to FIGS. 12 and 13 a magnet 29 is provided having a recess 30 in one face thereof for the reception of a flexible ring 31 or the like about the periphery of the recess 30. The recess is concave or slightly deeper progressively toward the central portion and the sealing compound 21 is disposed within the recess and within the confines of the ring 31. Due to the curve surface 30 the device may be applied either to a flat surface or to a slightly curved surface in the manner previously described.

It will be apparent that a relatively simple tank repair kit is provided which includes a relatively plastic adhesive sealing compound, a magnet for attaching itself with the relatively stable sealing compound (which is insoluble in water and the contents of a tank, such as oil or other liquid) to a ferrous structure such as an oil tank or the like. The patch is easily applied to the tank merely by applying the sealing compound to the face of the magnet and over a leak opening and then applying pressure by hand to force or extrude the sealing compound into the opening in the tank. The magnetic attraction to the ferrous structure will maintain the patch in position.

As disclosed in FIG. 15 an auxiliary tank bottom may be applied to the tank 16 such bottom being in the form of a slightly concave metal plate 32 having a resilient cushion or sheet 33 for holding a bonding agent such as the sealing compound 21. This metal plate may be fastened intimately to the bottom of the tank by means of straps 34. Since the magnetic patches are relatively thin, especially those of FIGS. 6, 7 and 8, and the relative thickness of the patch and the sheet 33 is such that they readily will be received or accommodated within the thickness of the resilient sheet making it unnecessary to remove them to apply the auxiliary tank bottom which will insure the maximum life of the tank. The plate 32 preferably is provided with a curvature to correspond to the tank surface to which it is applied. Also, the resilient sheet which is placed on the plate preferably is of a spongy substance of the character which will expand when moistened if, for example, by the oil coming through the leak opening although if desired a resilient sheet of closed shells may be employed.

FIGS. 14 and 16 illustrate a relatively thin flat plate type magnet 35 having a series of non-slip grooves 36 and adapted to be applied in the same manner as the magnet of FIGS. 6–8. The magnet is mounted on the cap 20′ of the container 20 in which the sealing compound 21 is stored.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A tank repair kit comprising a container having an open end and a closure therefor with a flat top surface thereon formed of ferrous metal,
   a patch device consisting of a leak-sealing plastic adhesive compound confined in said container until used for sealing purposes on a tank wall or the like,
   a relatively thin plate-like permanent magnet of polygonal shape having first and second faces which are generally parallel to each other throughout their entire dimensional extent,
   said magnet being initially mounted and magnetically secured on the flat top ferrous surface of the container closure by its inherent magnetic force,
   said first magnet face being substantially planar throughout the entire plan area of the magnet,
   said second magnet face constituting a pressure-receiving face and having a series of spaced grooves formed thereon,
   said grooves providing anti-slip means during manual application of the patch device to a ferrous tank wall,
   said leak-sealing plastic adhesive compound being of such consistency that it can be taken from the jar and rolled in a ball and then placed upon the flat face of the magnet whereby when said adhesive compound-receiving surface portion of the magnet is placed over a leak opening in a tank wall and pressure applied to said pressure-receiving face the adhesive compound will fill the leak opening and the excess will be forced to spread outwardly to form a thin sheet thereof between the magnet and the tank wall to form a bond therebetween, the magnetic effect of the magnet thereafter co-acting with the ferrous tank wall to securely maintain the patch device in its applied position on the wall of the tank.

2. In a tank repair mechanism of the class described the combination of:
   a magnet-reinforced repair patch device for application under mechanical pressure to the ferrous wall of a tank having an area thereof with a leak therein to be sealed consisting of a relatively thin plate-like permanent magnet of polygonal shape in plan and rectangular transverse section having opposed faces which are substantially parallel to each other throughout the entire extent of the magnet whereby the thickness of its end portions substantially corresponds to the thickness of the mid-portion thereof, one of said opposed faces constituting a pressure-receiving face, the other of said opposed faces having a leak-sealing plastic-like adhesive compound applied to a limited area thereof whereby when it is applied against the leaking area of the tank wall and mechanical pressure is applied against said other pressure-receiving face of the magnet said adhesive sealing compound is adapted to flow over the entirety of said first face and to extrude into the leak in the tank wall, the magnetic effect of the magnet thereafter co-acting with the ferrous tank wall and operative to maintain the patch device in its applied position, and a tank auxiliary metal plate member shaped to contactingly underlie the bottom of the leakage area of the tank wall to provide increased leakage prevention and reinforcement therefor, resilient cushioning means mounted on and substantially covering the entire upper surface of said auxiliary metal plate, the relative thickness of the patch magnet and cushion is such that the patch will be accommodated in the thickness of the resilient cushioning means, a layer of said leak-sealing adhesive compound on said resilient cushion means for cushioned application against the bottom wall area of the tank, and means for positioning and mechanically securing said tank auxiliary metal plate member in pressure relationship against the bottom area of the tank.

References Cited by the Examiner

UNITED STATES PATENTS

| | | | |
|---|---|---|---|
| 1,472,088 | 10/1923 | Puckett | 206—47 |
| 2,666,354 | 1/1954 | Dim et al. | 206—56 |
| 2,727,650 | 12/1955 | Moynihan et al. | 220—24 |
| 2,781,939 | 2/1957 | Lockwood | 220—24 |
| 2,977,994 | 4/1961 | Xenis | 138—97 |
| 3,078,183 | 2/1963 | Karalus. | |

THERON E. CONDON, *Primary Examiner.*

G. T. HALL, *Assistant Examiner.*